May 17, 1966  J. H. KRESS  3,251,243
VARIABLE-SPEED TRANSMISSION COMBINED WITH PLANETARY DRIVE
Filed May 21, 1962  2 Sheets-Sheet 1

INVENTOR.
J. H. KRESS

United States Patent Office 3,251,243
Patented May 17, 1966

3,251,243
VARIABLE-SPEED TRANSMISSION COMBINED
WITH PLANETARY DRIVE
James H. Kress, Cedar Falls, Iowa, assignor to Deere &
Company, Moline, Ill., a corporation of Delaware
Filed May 21, 1962, Ser. No. 196,283
14 Claims. (Cl. 74—689)

This invention relates to a transmission particularly useful in vehicles such as tractors or the like. The design incorporates a three-element planetary gearing with speeds in two of the elements being controlled to produce in the third (output) element a wide variety of speed ratios. One of the controlled elements is selectively clutchable to three different members to obtain three transmission ranges and the speed of the other controlled element is varied by a continuously variable drive so that the combined effect of the two controlled elements can produce the aforesaid wide variety of speed ratios in the third (output) element.

The principal object of the invention is to provide an improved transmission of the general character noted, and principally to arrange and design the parts to provide a compact and efficient organization thereof. It is a further object of the invention to utilize as coupling means a plurality of annular friction elements unitarily packaged with respect to the transmission. A still further object is to arrange the drive shafts in such manner as to organize same in a minimum of space while permitting sizes of ample strength for the purposes intended.

A significant feature of the transmission is the ability thereof to adapt itself from a certain speed in low range to the same speed in high range without changing the speed of the variable-speed drive. This permits smooth shifting between ranges and this in turn is exploited by the use of friction clutches.

The foregoing and other important objects and desirable features inherent in and encompassed by the invention will become apparent as a preferred embodiment thereof is disclosed in detail in the ensuing description and accompanying sheet of drawings, the figures of which are described below.

Figure 1:
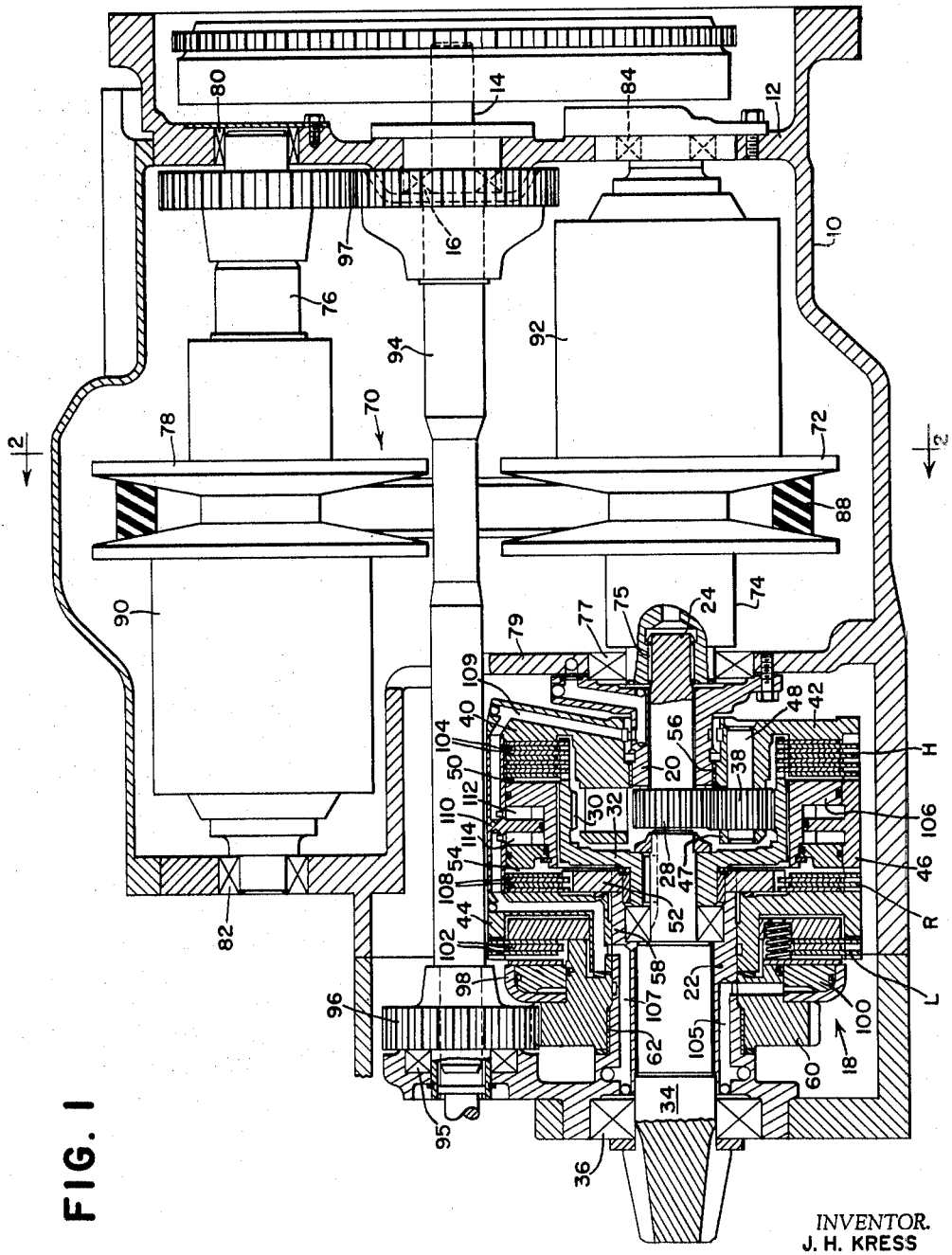
FIG. 1 is a longitudinal view, mainly in section, of the transmission.
Figure 2:
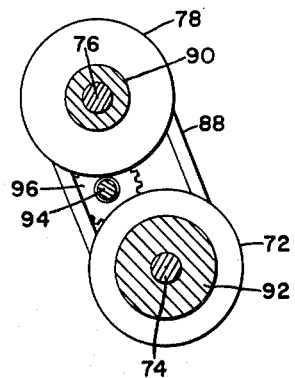
FIG. 2 is a section, on a reduced scale, as seen generally along the line 2—2 of FIG. 1.

For the purposes of clarity, the drive will be referred to as incorporated in a vehicle having front and rear ends and wherein the basic parts of the transmission are similarly oriented, with longitudinal shafts extending fore-and-aft; although, it will be appreciated that the geographical arrangement could be otherwise.

With the foregoing in mind, the forward end of the vehicle (not shown in its entirety) may be regarded as being at the right hand of the sheet of drawings. The vehicle may include any suitable housing, indicated generally by the numeral 10, which includes a forward wall 12 in which a basic power shaft 14 is suitably journaled at 16. The shaft may be driven by an internal combustion engine of the constant-speed or governed type.

Spaced rearwardly of the housing wall 10 is a planetary transmission denoted in its entirety by the numeral 18, and this is rotatably supported by or journaled in front and rear tubular housing supports 20 and 22, respectively, in a manner to be set forth below.

The front tubular support 20 coaxially surrounds a sun gear shaft 24 on the rear end of which is coaxially fixed a sun gear 28. A ring gear 30 is coaxially disposed intermediate the sun gear 28 and the forward part of the rear tubular support 22 and, for purposes of present illustration, is shown as having a radial web 32 coaxially connected to a rearwardly extending output shaft 34 which is journaled in the tubular rear part 22 at 36. The internal gear part of the ring gear 30 of course concentrically surrounds the sun gear 28, and a plurality of planet pinions 38 are in constant mesh with the sun and ring gears. A concentric planet carrier 40 has front and rear parts 42 and 44, respectively, disposed radially as respects the main axis of the gearing and these are coaxially interconnected by an annular or substantially cylindrical wall 46. The front wall or part 42 of the carrier 40, plus intermediate carrier portions 47, journals the planet pinions 38 as via planet pinion shafts 48.

The diameter of the generally hollow carrier 40 is such that the annular wall 46 thereof, at least adjacent to the forward portion thereof, is in annular encircling relationship to the ring gear 30, thereby providing an annular space 50, the purpose of which will presently appear. The tubular rear housing support 22 carries rigidly thereon a circular member which serves as a forward radial wall 52 which lies just ahead of the carrier rear wall 44, and the rear part of the ring gear 30 terminates forwardly ahead of the wall 52 to provide another annular space 54. The front and rear radial walls 42 and 44 of the carrier 18 are journaled respectively on the front and rear tubular housing supports 20 and 22, respectively, at 56 and 58.

A drive element in the form of a gear 60 is disposed in rearwardly spaced relationship to the carrier rear wall 44 and is coaxially journalled on the rear housing tubular support 22 at 62. In addition to its function in connection with the planetary drive 18, the gear 60 could be utilized to drive a power take-off shaft or other means, not shown.

Variable speed drive mechanism, denoted in its entirety by the numeral 70, is located forwardly of the planetary drive 18 and rearwardly of the front housing wall 12. The variable-speed mechanism includes a lower variable-speed driven sheave means 72 which is coaxially connected to a variable-speed driven shaft 74 which in turn is coaxially connected at 75 to the sun gear shaft 24, thus providing a variable-speed input to the sun gear 28. The connection at 75 includes an internal spline on the shaft 74 and an external spline on the shaft 24, whereby the front end of the shaft 24 is coaxially supported, the rear end of the shaft 74 being journaled at 77 in an intermediate wall 79 of the housing 10. The sun gear 28, which is rigid on the rear end of the sun gear shaft 24, is supported by its mesh with the planet pinions 38.

A driving shaft 76 carries thereon and coaxially therewith a dual variable-speed driving sheave means 78. The upper sheave and shaft assembly 76 and 78 is journaled in the housing 10, as by front and rear bearings 80 and 82. The lower sheave and shaft assembly 72–74 is journaled at its front end in a lower front bearing 84, which is of course coaxial with the bearing 77 already described. The variable-speed drive mechanism shown is for illustration only, since it may be of any type. Coaxially associated with the assemblies 72–74 and 76–78, respectively, are control cylinders 90 and 92, respectively, which may contain mechanism of any well-known type used for shifting one sheave part of each sheave assembly axially to effect changes in the driving diameters thereof.

A constant-speed input shaft 94, which is here provided as a coaxial extension of the engine or drive shaft 14, extends rearwardly between the opposed runs of the endless drive means 88, is journaled at its rear end at 95 and has coaxially fixed to its rear end a driving gear 96 which is in constant mesh with the rear gear 60 behind the planetary transmission 18.

From the description thus far, it will be seen that the constant-speed input 94 is utilized in association with the variable-speed input 74–24, and these are selectively effectuated in connection with the planetary transmission 18 to provide forward and reverse speeds in infinitely variable ranges. As will be clear to those versed in the art, the speed of the sun gear 28, which is connected to the variable-speed driven shaft 74, will be varied in accordance with variations in the effective driving diameters of the variable-speed sheaves 72 and 78, which is accomplished by any suitable operator-controllable means (not shown) having effect on the control cylinders 90 and 92 so that as the effective driving diameter of one sheave increases, that of the other will decrease. In the present case, the engine shaft 14 is geared to the variable-speed driving shaft 76 by appropriate gearing 97 so that the speed of the shaft 76 is somewhat different from that of the engine. For example, the maximum governed engine speed may be 1900 r.p.m. and it may be desired that the constant or uniform speed of the shaft 76 be 2000 r.p.m. Since the shaft 94 is a coaxial extension of the engine shaft 14, in the example given, will of course be 1900 r.p.m. The gear ratio between the gears 96 and 60 will of course establish the speed of the gear 60. If, by way of example, the variable-speed mechanism 70 is variable between ratios of .5:1 to 2:1, the speed of the sun gear 28 will vary between 1000 and 4000 r.p.m. As illustrated in the drawings, the ratio is 1:1.

In known transmissions where variable-speed and constant-speed inputs are applied to two elements of a planetary, without clutch control of the elements, known split-power or split-torque paths are available. For example, in the present case, if it be assumed that the gear 60 were permanently connected to the carrier 40, then the carrier would be driven at a constant speed from the shaft 94 and the sun gear would be driven at variable speeds from the variable-speed shaft 74, giving an infinitely variable drive. As distinguished from this, the present case separates the constant-speed input from the carrier in some phases of the drive and provides a plurality of coupling means for connecting the carrier selectively to the ring gear 30, to the housing 10 or to the gear 60. This will provide high, reverse and low ranges, and for this purpose there are three annular friction couplings provided, identified in their respective entireties by the letters H, R and L.

Figure 3:
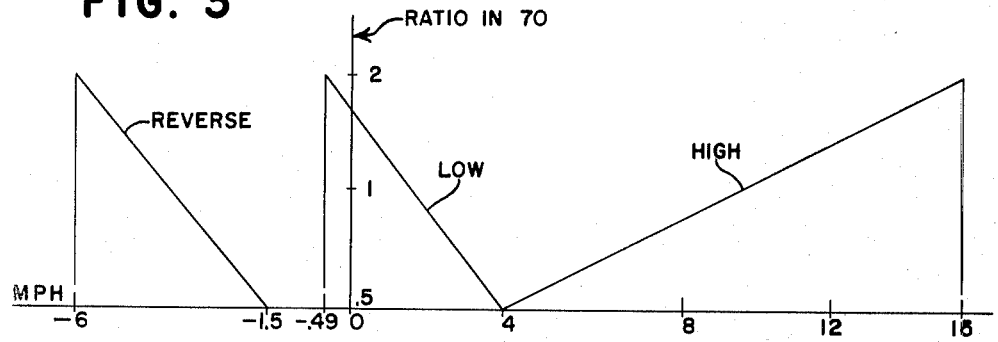
FIG. 3 is a graphic illustration of the speed relationships involved.

It was previously stated that the gear 60 was in coaxially rearwardly spaced relation to the rear part 44 of the planet carrier 40. This space is utilized for accommodating the low clutch L. In the present case, it is preferred that these couplings be operated hydraulically. Therefore, the forward face of the gear 60 carries coaxially thereon an annular chamber or cylinder 98 within which is carried a ring-like piston 100 for acting axially on a plurality of clutch plates 102 splined or otherwise connected alternately to the gear 60 and to the carrier 40 behind the rear wall 44. In other words, the supply of fluid under pressure to the cylinder 98 will cause the piston 100 to move to the right, compressing the clutch plates 102 against the carrier rear wall 44, thus engaging the low clutch L and coupling the gear 60 to the carrier. In this condition, the carrier will be driven at a constant speed which is here that of the gear 60 as driven by the input shaft 94 at the speed determined by the gear ratio between the gears 96 and 60, and the output shaft 34 can therefore be driven at an infinite number of speeds within a predetermined range by varying the speed of the sun gear 28 via the variable-speed mechanism 70. For example, in the present case, and with the clutch L engaged, the gear ratio at 96–60 may be such (e.g., 33/63) as to drive the planetary carrier 40 constantly at 1000 r.p.m. With a ratio of .5:1 in the variable-speed drive 70, the sun gear will be driven at 1000 r.p.m., which means that the ring gear output shaft rotates at 1000 r.p.m. In a typical installation, this could produce a forward speed of 4 m.p.h. (maximum in low range), and a predetermined portion of the horsepower would be recirculated through the variable-speed drive, a condition which is not unknown. As the ratio of the variable-speed mechanism 70 is increased to its maximum of 2:1, driving the sun gear shaft at 4000 r.p.m. and with the carrier still driven at 1000 r.p.m because the low clutch L is engaged, the speed of the output shaft 34 would correspondingly diminish, stop and reverse slightly in direction (FIG. 3). According to the present case, the lowest low speed would actually be approximately .5 m.p.h. in reverse.

To establish high range forward, the high clutch H is engaged and the low and reverse couplings are disengaged. The high clutch H includes a plurality of clutch plates 104 alternately splined or otherwise connected to the outer periphery of the ring gear 30 and the inner periphery of the carrier wall 46 and located in the previously described annular space 50 between the ring gear 30 and the annular wall 46 of the carrier 40. A dual annular piston 106 is disposed in the rear portion of this annular space and upon movement in one direction, to the right as illustrated, it will engage the high clutch H; upon movement in the opposite direction, it will engage the reverse coupling (or brake), which is provided by a plurality of coupling or brake disks or plates 108 alternately splined or otherwise secured to the carrier and to the front wall 52 of the tubular rear housing support 22 and disposed axially intermediate the carrier rear wall 44 and the rear face of the dual piston 106. An annular partition 110, integral with or otherwise secured to the annular wall 46 of the carrier, provides in conjunction with the piston 106 front and rear fluid-receivable chambers 112 and 114 respectively. Thus, when fluid under pressure is supplied to the chamber 112, the piston 106 moves forwardly or to the right, thus engaging the clutch plates 104 and establishing the engaged position of the high clutch H. Any suitable control may be utilized whereby when one of the couplings is engaged the other two are disengaged. Passages are shown here as being formed in the housing 10 at 105, 107 and 109 for supplying pressure fluid to the couplings L, R and H respectively. For reasons to presently appear, the disclosed transmission lends itself particularly well to power shifting. With the clutch H engaged exclusively of the couplings L and R, the planetary transmission is locked up and high range is obtainable, providing a direct drive to the output shaft 34, the speed of rotation of which varies according to the speed of rotation of the variable-speed driven shaft 74 as the ratio between the two sheaves 72 and 78 is varied between .5:1 and 2:1.

When fluid under pressure is supplied to the chamber 114, piston 106 moves rearwardly to engage the coupling or brake plates 108 and locks the carrier 40 to the housing via the housing rear support wall 52. Therefore, with the planetary carrier fixed the planetary reaction is such as to drive the output shaft 34 reversely, the speed of which varies according to the changes in ratio in the variable-speed mechanism 70.

The foregoing has explained the basic mechanics of selectively obtaining the three basic ranges L, R and H, and it has also shown that infinite variations in speed in each range can be secured. Attention is now directed to FIG. 3 and the characteristics of the drive that adapt it especially for shifting between high and low ranges.

As will be seen in FIG. 3, 4 m.p.h. is the top of low range and the bottom of high range, but of greater significance is that in either range, this speed occurs with the variable-speed drive 70 at its .5:1 ratio. Therefore, shifts between high and low ranges can be achieved simply by engaging and disengaging the high and low clutches H and L. It is not necessary to change the mechanism 70. For example, at 4 m.p.h. in low range, the clutch L is engaged and couplings H and R are disengaged. To shift to high range, clutch L is disengaged and coupling R remains disengaged. Now, the ratio of the mechanism 70 may be adjusted from .5:1 to 2:1 to increase forward speed from 4 m.p.h. to 16 m.p.h.

The significance here is that it is not necessary to recycle the mechanism 70; i.e., if the change from low range to high range occurred between the tops of each range, the result would be a change between 4 m.p.h. and 16 m.p.h., a tremendous leap, and to avoid this and change from, say, 4 m.p.h. to 5 m.p.h., it would be necessary to adjust the drive 70 down from the assumed 2:1 ratio to slightly above .5:1, thus requiring a considerable time lapse. Since, according to the present invention the change is effected simply by "exchanging" clutches, the time lapse is eliminated and a smooth even shift can be effected.

As will also be seen in FIG. 3, the speed range in reverse is asymmetrical as respects that in low, which means that a direct shift from low to reverse, without changing the ratio in the drive 70, will not produce the same speed in reverse as in forward, with one exception and this is only approximate; viz., such shift at 3 m.p.h. forward to reverse will give 2.5 in reverse (−2.5 m.p.h.). A direct shift at 1 m.p.h. forward will give 4.5 m.p.h. in reverse. Hence it becomes necessary to recycle the drive 70—to adjust it to a different ratio to avoid objectionable disparities between forward and reverse speeds. But in these circumstances the time delay is not as significant as the same characteristic occurred in a high-to-low or low-to-high shift. Thus, the lack of symmetry is not a particular disadvantage.

On the other hand, another advantage of this transmission is its ability to pass through 0 r.p.m. in low range (0 m.p.h. −5 m.p.h.), which is of value in maneuvering. That is, a slow speed in reverse can be obtained without shifting to the reverse range.

As already indicated, the particular type of control utilized for applying and releasing the friction couplings L, R and H forms no part of the present invention. It should be observed, however, that the three coupling means L, R and H are compactly associated in coaxial relationship among themselves as well as in concentric relationship to the other parts with which they are associated. This provides for a material shortening in the fore and aft length of the transmission. Reduction in other dimensional characteristics of the transmission is achieved by extending the shaft 94 rearwardly in radially offset relationship to the carrier 40 and through the opposite runs of the endless drive means 88 between the variable-speed sheaves 72 and 78. The interjournaling of the various drive parts on the tubular housing supports is also a feature contributing to the compact organization of the transmission.

Features and advantages other than those enumerated will readily occur to those versed in the art, as will many modifications and alterations in the preferred embodiment disclosed, all of which may be achieved without departure from the spirit and scope of the invention.

What is claimed is:

1. A transmission, comprising: a housing having front and rear coaxially spaced apart tubular supports rigid thereon; a sun gear shaft extending coaxially through the front support and having a sun gear fixed thereto axially intermediate said supports; a ring gear coaxially intermediate said supports and concentrically encircling the sun gear and having coaxially fixed thereto an output shaft extending coaxially rearwardly through said rear support; a planet carrier having front and rear radial parts coaxially journaled respectively on said front and rear supports and a cylindrical wall axially connecting said parts and concentrically encircling the ring gear to provide an annular space between said wall and ring gear; planet pinions journaled on the carrier front part and meshing with the ring and sun gears; a drive element coaxially journaled on said rear support rearwardly of the carrier rear part; drive mechanism forwardly of the housing and including variable-speed input means coaxially connected to the sun gear shaft and constant-speed input means extending rearwardly of the housing and connected to the drive element; first annular friction coupling means in said annular space and selectively engageable and disengageable between the carrier and ring gear; second annular friction coupling means concentric with and selectively engageable and disengageable between the carrier rear part and the rear support; and third annular friction coupling means concentric with and selectively engageable and disengageable between the carrier rear part and the drive element.

2. A transmission, comprising: a housing having front and rear coaxially spaced apart tubular supports rigid thereon; a sun gear shaft extending coaxially through the front support and having a sun gear fixed thereto axially intermediate said supports; a ring gear coaxially intermediate said supports and concentrically encircling the sun gear and having coaxially fixed thereto an output shaft extending coaxially rearwardly through said rear support; a planet carrier having front and rear radial parts coaxially journaled respectively on said front and rear supports and a cylindrical wall axially connecting said parts and concentrically encircling the ring gear to provide an annular space between said wall and ring gear; planet pinions journaled on the carrier front part and meshing with the ring and sun gears; a drive element coaxially journaled on said rear support rearwardly of the carrier rear part; drive mechanism forwardly of the housing and including a variable-speed driven shaft coaxially connected to the sun gear shaft, a variable-speed driving shaft parallel to the driven shaft and offset radially beyond the outer periphery of the carrier, variable-speed sheave means respectively on said driving and driven shafts, endless flexible drive means trained about said sheaves and having spaced apart runs extending between said sheaves, and a constant speed input shaft parallel to the driving and driven shafts and extending between the aforesaid runs and rearwardly past the carrier in radially offset relation thereto and having a drive connection to the drive element; first annular friction coupling means in said annular space and selectively engageable and disengageable between the carrier and ring gear; second annular friction coupling means concentric with and selectively engageable and disengageable between the carrier rear part and the rear support; and third annular friction coupling means concentric with and selectively engageable and disengageable between the carrier rear part and the drive element.

3. A transmission, comprising: a housing having front and rear coaxially spaced apart supports rigid thereon; a sun gear shaft extending rearwardly past the front support and having a sun gear fixed thereto axially intermediate said supports; a ring gear coaxially intermediate said supports and concentrically encircling the sun gear and having coaxially fixed thereto an output shaft extending rearwardly past said rear support; a planet carrier having front and rear radial parts coaxially journaled respectively on said front and rear supports and a cylindrical wall axially connecting said parts and concentrically encircling the ring gear to provide an annular space between said wall and ring gear; planet pinions journaled on the carrier front part and meshing with the ring and sun gears; a drive element coaxially journaled on said rear support rearwardly of the carrier rear part; drive mechanism forwardly of the housing and including variable-speed input means coaxially connected to the sun gear shaft and constant-speed input means extending rearwardly of the housing and connected to the drive element; first coupling means selectively engageable and disengageable between the carrier and ring gear; second coupling means selectively engageable and disengageable between the carrier rear part and the rear support; and third coupling means selectively engageable and disengageable between the carrier rear part and the drive element.

4. A transmission, comprising: a housing having front and rear coaxially spaced apart supports rigid thereon; a sun gear shaft extending rearwardly past the front support and having a sun gear fixed thereto axially intermediate said supports; a ring gear coaxially intermediate said supports and concentrically encircling the sun gear and having coaxially fixed thereto an output shaft extending rearwardly past said rear support; a planet carrier having front and rear radial parts coaxially journaled respectively on said front and rear supports and a cylindrical wall axially connecting said parts and concentrically encircling the ring gear to provide an annular space between said wall and ring gear; planet pinions journaled on the carrier front part and meshing with the ring and sun gears; a drive element coaxially journaled on said rear support rearwardly of the carrier rear part; drive mechanism including variable-speed input means coaxially connected to the sun gear shaft and constant-speed input means connected to the drive element; first coupling means in said annular space and selectively engageable and disengageable between the carrier and ring gear; second coupling means selectively engageable and disengageable between the carrier rear part and the rear support; and third coupling means selectively engageable and disengageable between the carrier rear part and the drive element.

5. A transmission, comprising: a housing; a sun gear shaft journaled in the housing and having a sun gear fixed thereto; a ring gear concentrically encircling the sun gear and having coaxially fixed thereto an output shaft journaled in the housing; a planet carrier coaxial with the sun gear and journaled in the housing and having an annular part concentric with the ring gear; planet pinions journaled on the carrier and meshing with the ring and sun gears; a drive element coaxial with the ring and sun gears and journaled in the housing; drive mechanism axially offset from the aforesaid gearing and including variable-speed input means coaxially connected to the sun gear shaft and constant-speed input means connected to the drive element; first coupling means selectively engageable and disengageable between the carrier annular part and the ring gear; second coupling means selectively engageable and disengageable between the carrier and the housing; and third coupling means selectively engageable and disengageable between the carrier and the drive element.

6. A transmission, comprising: a housing; positive input means; variable-speed input means; a planetary gear train carried in the housing and including concentrically arranged sun gear, ring gear and carrier elements, said carrier element journaling planet pinions meshing with the sun and ring gear elements and further having an annular concentric portion; an output shaft; means connecting one of said gear elements to the output shaft; means connecting the other of said gear elements to the variable-speed input means; and three friction couplings concentric with the carrier annular portion for selectively connecting the carrier to the housing, to the positive input means or to one of the gear elements of the planetary train, each coupling including a friction plate concentric with and mounted on the carrier.

7. A transmission, comprising: a housing; positive input means; variable-speed input means; a planetary gear train carried in the housing and including concentrically arranged sun gear, ring gear and carrier elements, said carrier element journaling planet pinions meshing with the sun and ring gear elements and further having an annular concentric portion; an output shaft coaxial with and connected to one of said gear elements; an input shaft coaxially connected to the other of said gear elements and to the variable-speed means; an input gear coaxial with and journaled relative to the carrier and driven by the positive input means; and three friction couplings concentric with the carrier annular portion for selectively connecting the carrier to the housing, to the input gear or to one of the gear elements of the planetary train, each coupling including a friction plate concentric with and mounted on the carrier.

8. A transmission, comprising: positive drive means; variable-speed drive means; a housing; a planetary gear train carried by the housing and including first, second and third coaxial elements and planetary pinions carried by one element and meshing with the other two; an output shaft connected to and driven by the first element; a first input member drivingly connected to the positive drive means and coaxially journaled relative to the second element; a second input member drivingly interconnecting the third element and the variable-speed drive means; a support concentrically carried by and fixed to said second element; and three coaxial friction couplings, each including a friction plate fixed to said support, selectively engageable and disengageable between the second element and the housing, between said second element and the first input member, or between said second element and one of the other elements.

9. A transmission, comprising: a housing having coaxially spaced supports; variable-speed drive means having a rotatable input member coaxially adjacent to one support; an output member extending coaxially adjacent to the other support; a planetary gear train coaxially intermediate the input and output members and including first, second and third elements of which two are gears and the other is a carrier journaling planet pinion means meshing with the gears; positive drive means including a rotatable input member coaxial with and spaced from the variable-speed input member in the direction of the output shaft; means journaling the positive drive means input member relative to the gear train, output member and variable-speed input member; means coaxially connecting the output member to the first element of said gear train; means coaxially connecting the third element to the variable-speed input member; a mounting part coaxially intermediate the two input members and fixed to the second element; and first, second and third coaxial friction coupling means having portions carried by said part and other portions carried respectively by the positive drive input member, the housing and one of said elements other than said second element for selective engagement and disengagement to cause operation of the transmission respectively in low, reverse and high ranges.

10. The invention defined in claim 9, in which: two of said couplings are coaxially spaced apart along said mounting part; and a coupling operator is concentrically carried by said part axially intermediate said two couplings for movement in one direction to engage one of said two couplings and in the opposite direction to engage the other of said two couplings.

11. The invention defined in claim 9, in which: said part is in the form of a drum having axially opposite ends respectively including radial flanges, two of said couplings are coaxially spaced apart between said flanges; and a coupling operating annulus is concentrically carried by the drum for axial shifting in one direction to engage one of said two couplings with one flange and in the opposite direction to engage the other of said two couplings with the other flange.

12. The invention defined in claim 11, in which said annulus is a two-way hydraulic piston having a medial annular groove, and said second element has fixed thereto an annular partition dividing said groove into two separate annular fluid-pressure-receivable chambers.

13. A transmission, comprising: positive drive means; variable-speed drive means; a housing; a planetary gear train carried by the housing and including first, second and third coaxial elements and planetary pinions carried by one element and meshing with the other two; an output shaft connected to and driven by the first element; a first input member drivingly connected to the positive drive means and coaxially journaled relative to the second element; a second input member drivingly interconnecting the third element and the variable-speed drive means; a clutch support concentrically carried by and fixed to said second element; and a pair of friction clutches coaxial with each other and with the gear elements, one of said clutches being selectively engageable and disengageable between said second element and the first input member and the other of said clutches being selectively engageable and disengageable between said second element and one of the other two elements.

14. The invention defined in claim 13, wherein the ratio in the planetary gear train is such that when both input members are rotating at the same speed, the output shaft rotates at a given speed irrespective of which clutch is engaged, so that if while the one clutch is engaged and the speed of the second input member is increased, the output member will decrease in speed and if, while the other clutch is engaged and the speed of the second input member is increased, the speed of the output member will increase.

References Cited by the Examiner
UNITED STATES PATENTS

| | | |
|---|---|---|
| 2,180,202 | 11/1939 | Halldren. |
| 2,439,079 | 4/1948 | Davidson _____ 74—740 |
| 2,719,442 | 10/1955 | O'Leary _____ 74—740 X |
| 2,933,952 | 4/1960 | Schou _____ 74—689 |
| 3,091,132 | 5/1963 | Mayfield et al. _____ 74—722 |

DAVID J. WILLIAMOWSKY, Primary Examiner.

DON A. WAITE, Examiner.

T. C. PERRY, Assistant Examiner.